Sept. 29, 1959 W. J. CROSHIER ET AL 2,906,029
WIRE HOLDER FOR THREE WIRE METHOD OF MEASURING THREADS
Filed May 26, 1958 5 Sheets-Sheet 1

INVENTORS
Walter J. Croshier
John Klink
BY Darly + Darly
ATTORNEYS

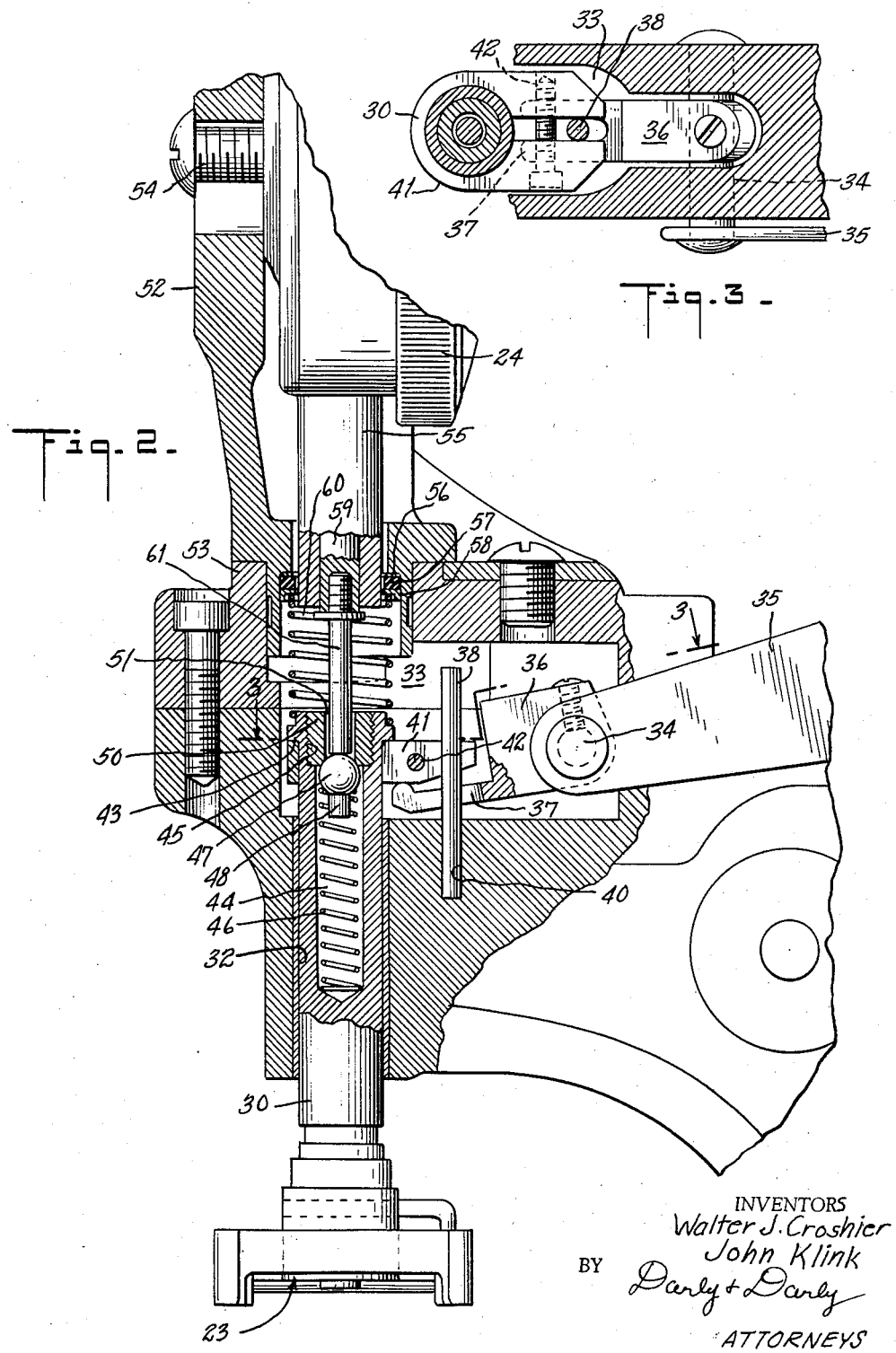

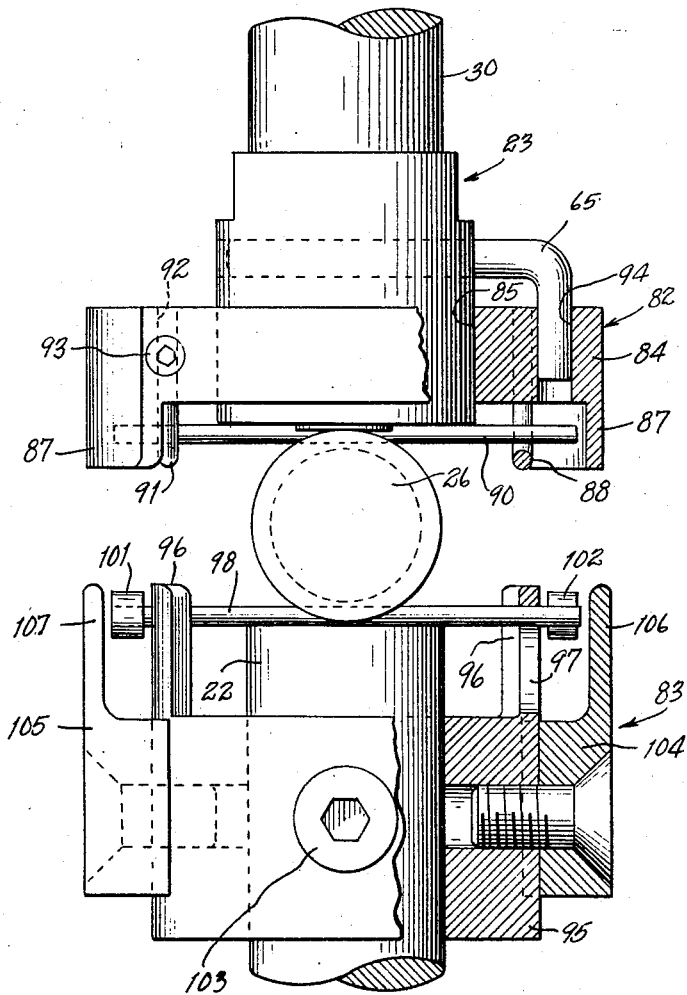

Sept. 29, 1959   W. J. CROSHIER ET AL   2,906,029
WIRE HOLDER FOR THREE WIRE METHOD OF MEASURING THREADS
Filed May 26, 1958   5 Sheets-Sheet 4
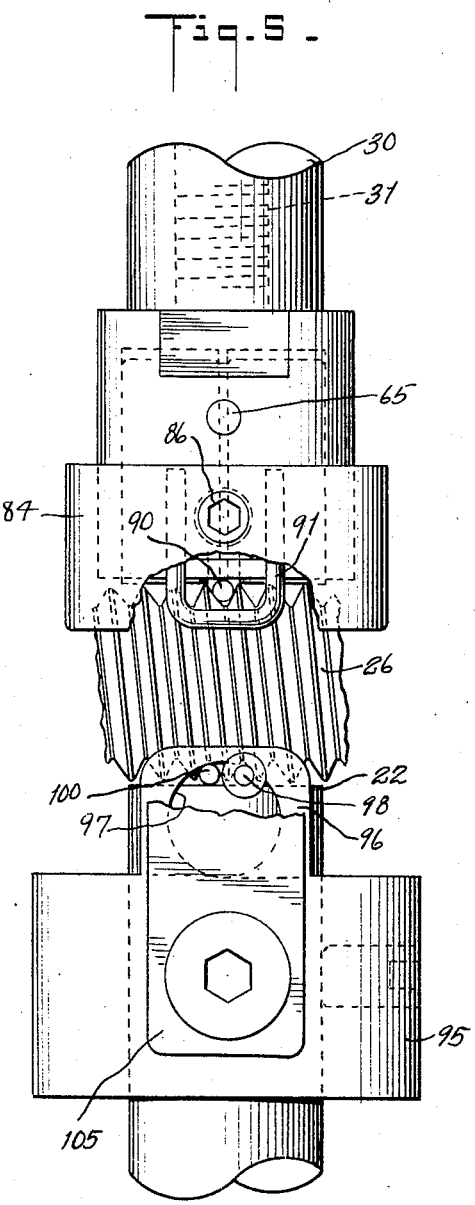
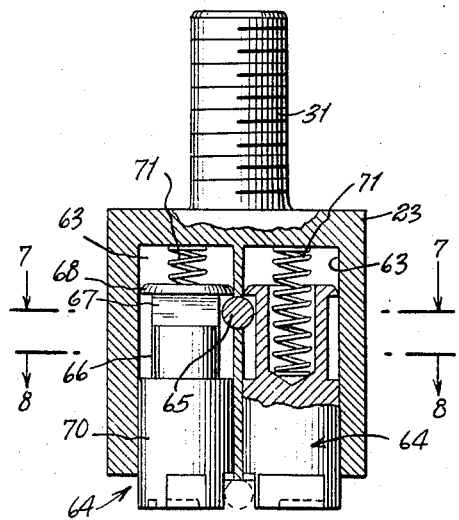
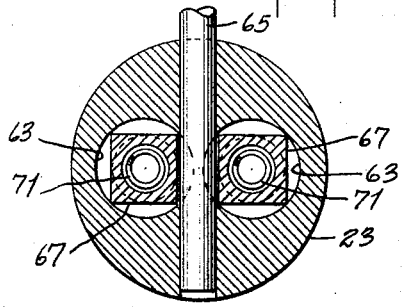
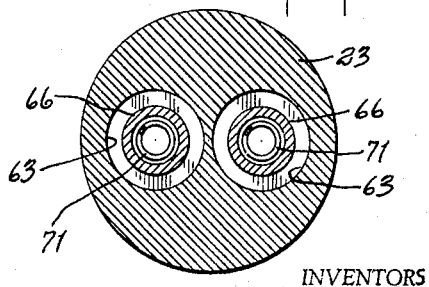
INVENTORS
Walter J. Croshier
John Klink
BY Darby + Darby
ATTORNEYS

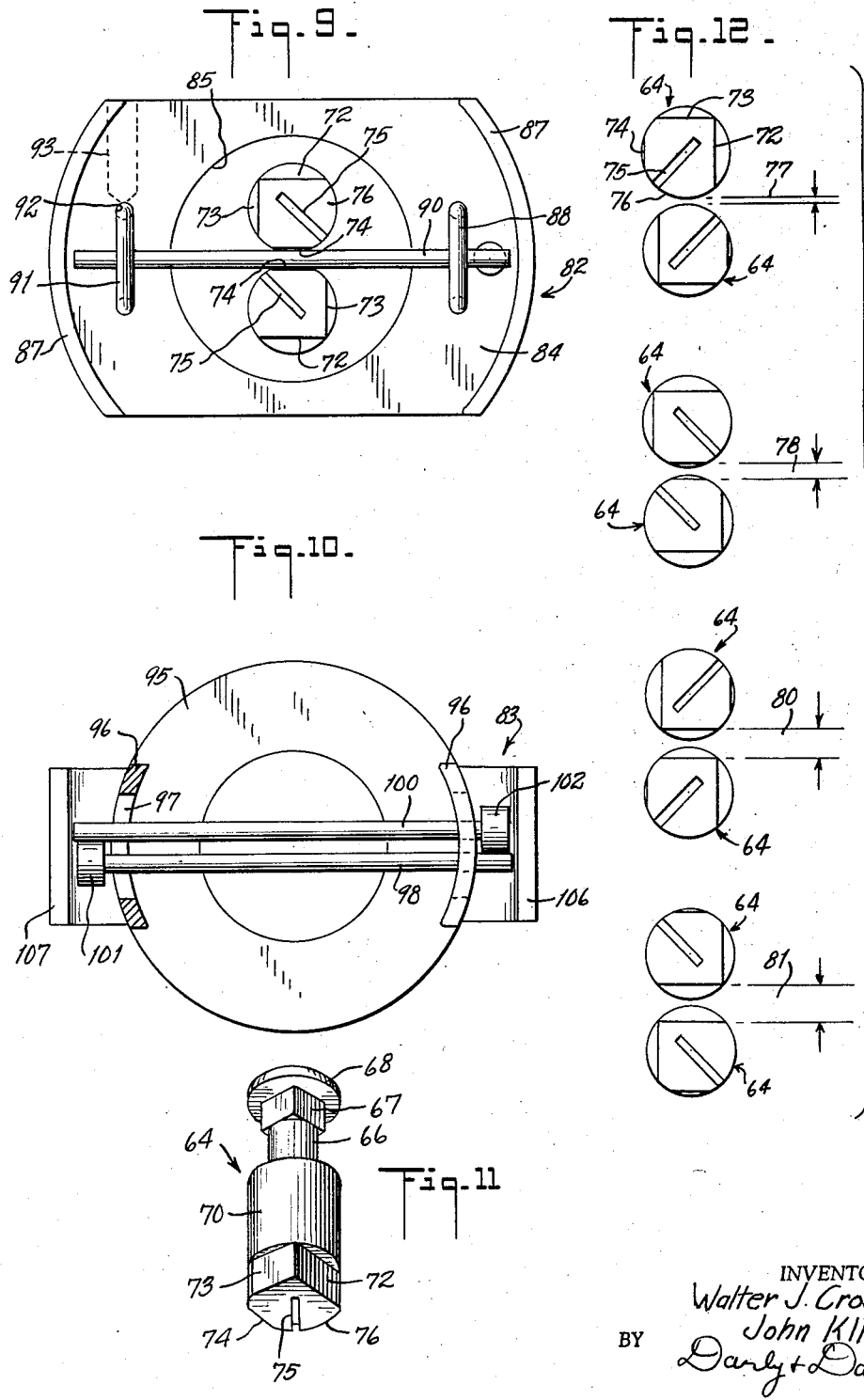

United States Patent Office 2,906,029
Patented Sept. 29, 1959

2,906,029

WIRE HOLDER FOR THREE WIRE METHOD OF MEASURING THREADS

Walter J. Croshier, Hyde Park, and John Klink, Pine Plains, N.Y., assignors to Standard Gage Company, Inc., Poughkeepsie, N.Y., a corporation of New York Application May 26, 1958, Serial No. 737,811

4 Claims. (Cl. 33—167)

This invention relates to a thread gaging device for gaging threads by use of a three wire method. The device of the instant invention is an improvement upon the device disclosed in Klink Patent No. 2,822,624, assigned to the assignee of the instant invention. In the Klink arrangement, in order to gage threads of a range of sizes it was necessary to remove the entire gaging anvil structure and replace it with a similar structure utilizing gaging wires of the desired size.

In the instant invention means are provided whereby adjustment of the centralizing plungers similar to the centralizing plungers of the Klink patent is made possible, and such adjustment permits the use of wires of a variety of sizes extending from 80 pitch to 8 pitch.

It will thus be seen that the present invention constitutes an improvement on the invention of the Klink patent above mentioned which renders it possible to readily utilize the same gage for gaging threads throughout a large range by replacing the gage wires only and performing a simple adjustment to provide for properly centralizing the single wire in a thread portion intermediate the two wires which lie in the thread on the opposing anvil.

It is an object of the invention to provide a wire holder for utilization in the three wire method of measuring threads which wire holder is adapted to a wide variety of gaging wire sizes.

It is another object of the invention to provide such a wire holder which is provided with centralizing plungers adjustable to a number of different positions to properly cooperate with gaging wires of the large range of sizes mentioned.

It is still another object of the invention to provide for an adjustment of the centralizing plungers to a number of positions less than the total number of gage wires, the plungers properly cooperating in each adjusted position with the wires of a group of wire sizes.

Other objects and features of the invention will be apparent when the following description is considered in connection with the annexed drawings, in which, Figure 1 is a side elevational view of an external thread gage embodying the subject matter of this invention. The gage illustrated is of the usual snap gage type, but is arranged with a retracting lever and stop member to adapt it to use with the gaging wires and holders of this invention;

Figure 2 is a fragmentary enlarged view of the upper portion of the gage of Figure 1 showing particularly the construction of the retracting means;

Figure 3 is a horizontal cross sectional view taken on the plane of the line 3—3 of Figure 2 showing the construction of the retracting lever and its cooperating parts;

Figure 4 is a side elevational view to an enlarged scale showing the wire holders of the instant invention mounted on the gage anvils. This view is partly broken away in order to show details of the construction of the wire holders;

Figure 5 is a front elevational view of the gage portion shown in Figure 4 illustrating particularly the mode of utilizing the gage for its intended purpose and showing particularly a mode in which the wires are retained in position on the anvils while being free to adjust to the particular thread being gaged;

Figure 6 is a vertical cross sectional view of the upper gaging head showing the mode for adjustably mounting the centralizing plungers in the upper anvil;

Figure 7 is a horizontal cross sectional view taken on the plane of the line 7—7 of Figure 6 and showing the mode for retaining the centralizing plungers in an adjusted position;

Figure 8 is a horizontal cross sectional view of the anvil of Figure 6 further illustrating the construction of the centralizing plungers which makes it possible to adjust them to the desired positions;

Figure 9 is a bottom plan view of the upper anvil showing a gaging wire in position between the centralizing plungers and further illustrating the shapes of the protruding parts of the centralizing plungers and the mode in which they cooperate to provide varying gaps therebetween to accommodate gaging wires of a range of sizes;

Figure 10 is a top plan view of the lower anvil showing the mode of mounting the two gaging wires thereupon;

Figure 1:
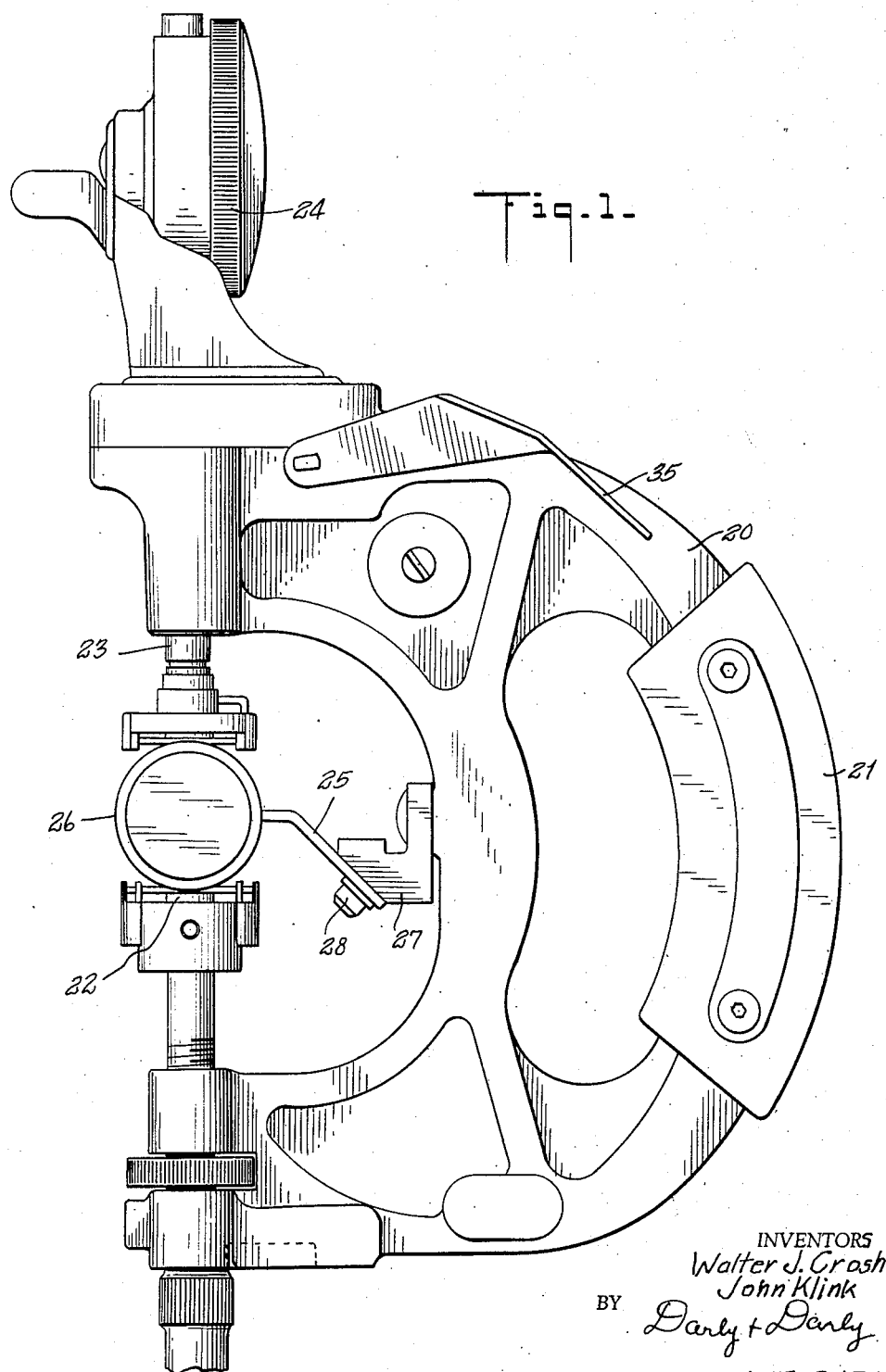

Figure 11 is a perspective view of one of the centralizing plungers of the upper anvil showing particularly the configuration thereof which enables it to be adjusted to a plurality of positions and to provide, by cooperation with a second similar plunger, for the variable gap hereinabove mentioned; and Figure 12 is a fragmentary showing of the pairs of centralizing plungers in bottom plan view illustrating the adjusted position of the plungers to provide for four different gaps between the plungers of the pair.

Referring now to the drawings and particularly to Figures 1 and 2, the gage chosen for illustration in connection with my invention consists of the usual U-shaped frame 20 which has a hand grip portion 21 and which has a fixed anvil 22 mounted in the lower arm of the U. A movable anvil 23 is mounted in the upper arm of the U and serves to transmit motion in the usual manner to a dial indicator 24 also mounted on the upper arm of the U-shaped frame 20. Additionally, a stop member 25 is mounted on the U-shaped frame with the stop adjustably positioned between the anvils 22 and 23 so that the workpiece indicated at 26 may be properly positioned centrally of the anvil. As will be hereinafter described, the stop 25 is mounted on a bracket 27 by means of a screw 28 so that it may be adjusted in two directions simultaneously to be properly positioned for workpieces of larger or smaller size.

Referring now to Figure 2, the construction of the motion transmitting and plunger retracting means will be considered. Anvil 23 is fixed in the movable shank 30 in any suitable manner as for example by means of the screw threads illustrated in Figure 6 at 31. Anvil shank 30 extends freely through an opening 32 in the upper arm of frame 20. The upper end of the anvil shank lies in a cavity 33 formed in the upper arm of frame 20.

A pivot pin 34, Figures 2 and 3, extends horizontally through the upper arm the center portion thereof lying within the cavity 33. Fixedly mounted on this pivot pin 34 externally of the frame is the retracting lever 35. Fixedly mounted on the pin 34 within the cavity 33 is an operating arm 36 which is bifurcated at its left hand end forming the two prongs 37. Extending between prongs 37 is a guide pin 38 which is driven into a bore 40 in the lower wall of the cavity 33 as is clearly seen in Figure 2. Mounted on the shank 30 within the cavity 33 is a split clamp 41 which is provided with a clamping screw 42 by means of which the clamp is tightened upon the shank 30.

The prongs or bifurcations 37 of the operating arm 36 underlie the clamp 41 and thus prevent any downward movement beyond the position indicated in Figure 2. In addition to the clamping action provided by clamp 41 the shank 30 is provided with an annular rib 43 thereupon which lies above the clamp 41 so that the shank 30 cannot move independently of the clamp 41.

The shank member 30 is provided with a counterbored portion 44 extending from its upper end downwardly, this counterbore being enlarged at its upper end as indicated at 45. Mounted in the bore 44 is a spring 46 one end of which bears against the lower edge of the bore and the other end of which bears against a ball 47 which ball is provided with a cylindrical projection 48 at its lower edge which fits within the turns of the spring 46. The enlarged bore 45 is threaded and a plug 50 having a central aperture 51 therein is threaded into this bore.

As has been indicated, a dial indicator 24 of usual construction is mounted in the upper arm of the gage, the construction comprising an arm 52 fixed to the cover plate 53 which extends over the cavity 33. The dial indicator is fixed to the arm 52 by means of the usual mounting screw 54. The indicator stem 55 of the dial indicator 24 extends downwardly through an opening in the cylindrical boss portion of the arm 52 being centralized in this opening by means of a washer 56, rubber ring 57 and centralizing collar 58.

Extending between the centralizing collar 58 and the upper surface of the rib 43 is a spring 60 which forces the anvil shank and anvil to its lower position being compressed when the anvil is moved upwardly either by gaging action or by means of the retraction lever 35.

Screwed into the lower end of the measuring plunger 59 of the dial indicator 24 in place of the usual contact button is a contact rod 61 which bears against the upper surface of the ball 47 which in turn is seated against plug 50 and held in contact by the spring 46. Thus when the anvil is raised the movement thereof compresses the spring 60, and when the distance moved exceeds the movement of rod 61 the ball 47 will leave its seat while spring 46 is further compressed. Since spring 46 is stronger than the combination of springs in the indicator the ball can leave its seat on plug 50 only after rod 61 has reached its up-stop position, or if it is rising slower than plug 50. This latter condition could occur during a sudden upward movement of the shank 30 while inertia of the indicator parts is retarding the motion of rod 61. Although this construction permits a shockproof movement, it is used primarily to provide a range of anvil retraction which is considerably greater than the maximum movement of the indicator spindle. It will, however, be understood that the indicator may itself be provided with a shockproof construction in a manner which is now common in the art.

Although the gage described above is of particular advantage in connection with thread gaging by the three wire method, it may be utilized for other gaging purposes and therefore it will be understood that the description of the gaging structure is given for purposes of illustration and not to limit its use to the three wire gaging method which will be hereinafter described.

Referring now to Figures 4 through 12, the construction of the wire holders including the centralizing plungers will be described. As indicated hereinabove, the upper anvil member is threaded as indicated at 31 in Figure 6 and is suitably fastened in the anvil shank 30. This upper anvil 23 is provided with the two bores 63 in which centralizing plungers 64 are individually mounted. Extending through the anvil 23 from front to rear is a rod 65 which serves to lock the plungers 64 in an adjusted position of rotation.

The upper portion of each centralizing plunger 64 is reduced in diameter at 66 and provided with a squared portion at 67, the extreme upper portion being cylindrical as indicated at 68, matching the main portion 70. Thus cylindrical portions 68 and 70 provide bearing surfaces for the centralizing plungers in the respective bores 63 in the anvil 23.

Each centralizing plunger is provided with a cylindrical bore in its upper end and springs 71 mounted in these bores and bearing against the upper surface of the bores 63 urge the plungers downwardly against the rod 65.

The lower ends of the centralizing plungers 64 are provided with flatted surfaces as indicated at 72, 73 and 74 and are additionally provided with screw driver slots 75. Thus by inserting a screw driver blade in one of the slots 75 the corresponding plunger 64 may be raised, disengaging the squared portion 67 of the plunger from rod 65 and engaging the cylindrical portion which has the relation of the inscribed circle to the squared portion of the rod. As a result, the plunger may then be rotated through an angle of 90° or a multiple thereof and then released whereupon the spring 71 will urge it downwardly to its normal position in which the rod 65 again engages the squared portion 67. As will be seen by reference to Figure 12 the screw driver slots are arranged relative to the flatted surfaces 72, 73, 74 and the rounded surface 76 in such a manner that when the screw driver slots extend parallel to each other in one of the four relationships indicated in Figure 12, corresponding surfaces 72, 73, 74 or 76 are presented to each other thus providing for adjustment of the distance between these surfaces as indicated in Figure 12 at 77, 78, 80 and 81 respectively.

Referring now particularly to Figures 4, 5, 9 and 10 it will be seen that wire holders 82 and 83 are provided. The upper wire holder 82 comprises a generally rectangular block 84 having a central aperture 85 which is slipped over the cylindrical anvil 23 and is fixed in position thereon by means of a setscrew 86 which is threaded into the block and seated against the side wall of the anvil. The block-like member 84 has depending flanges 87 formed integrally therewith, said flanges being annular about the center of the anvil 23.

Fixed in the block 84 adjacent the right hand edge thereof as seen in Figure 4 is a U-shaped member 88 which serves to hold one end of a gaging wire 90 in position adjacent the lower face of the anvil and between the centralizing plungers 64. The forward end of the gaging wire 90 is similarly retained in position by a loop 91 which, however, is not fixed in the block but is inserted into bores 92 therein and held in position by a setscrew 93. By virtue of this construction the forward loop 91 (left hand in Figure 4), can be removed, the wire 90 then being readily removable by sliding it forwardly and downwardly and replaced by a different size of wire. The depending flanges 87 prevent the wire 90 from sliding out of the supporting loops 88 and 91 while the loop 91 is in its normal position.

A bore 94 in the rear portion of the block 84 accommodates the bent-over end of the locking rod 65 and thus holds the rod 65 in position between the two centralizing plungers 64 while at the same time providing for easy removal of the centralizing plungers by merely removing block 84 from the anvil after which the rod 65 can be slid rearwardly releasing the plungers for removal.

The loops 88 and 91 are of sufficient lateral extent so that a wire of proper size located between the centralizing plungers may pivot and align itself with the threads of a member being gaged in substantially the same manner as is described in considerable detail in the Klink patent above mentioned.

The lower anvil member 83 is quite similar to the upper anvil member 82, but has certain differences. This lower anvil member, like the upper anvil member, comprises a block 95 which is again generally rectangular and is provided with the upwardly extending annular flanges 96 having the same center as the anvil 22. The upwardly extending flanges 96 are provided with circular openings 97 therein. Through these openings the gaging wires 98 and 100 extend, the position and freedom of movement of the wires on the anvil being determined by the axial position of the block 95 relative to the shank of anvil 22.

To explain this in somewhat greater detail each of gaging wires 98 and 100 is provided with a collar 101 or 102 at one end thereof, these collars being of a diameter to properly space the two gaging wires relative to the thread which they are adapted to gage. Since the wire size of the gaging wires 98 and 100 varies with the wires to be gaged and the collars are adjusted to this variation, it will be obvious that a greater or less space will be required to permit the desired limited freedom of movement of the wires on the face of anvil 22. As will readily be seen by reference to Figure 5, as the block 95 is moved upwardly the apertures 97 likewise move upwardly providing a greater space for movement of the wires on the anvil face and conversely a downward movement of the block 95 limits the freedom of movement of the wires.

The block 95 is held in its adjusted position on the shank of anvil 22 by any suitable means as for example the setscrew 103. In order to prevent the wires 98 and 100 from sliding out of the holder the flange members 104 and 105 are fixed to the rear and front surfaces respectively of the block 95 the upwardly extending flanges 106 and 107 then preventing forward or rearward movement of the gaging wires 98 and 100.

As will be clear from the above description, when the gage is to be used the proper set of three wires for the particular thread to be gaged is placed in the position, one in the upper holder 82 and two in the lower holder 83, the wires being given the proper freedom of movement by adjusting the height of the holder 83 and by adjusting the rotational position of the plungers 64 in the manner described above. Of course, if the position of the plungers is such as to accommodate and give the proper freedom of movement to wires of the desired size, no adjustment need be made, but if the wires to be used are within a different range than provided for by the adjustment of the plungers then by the use of a screw driver in the slots 75 the plungers are adjusted to give a proper freedom of movement for wires within the gaging frame of those selected.

The use of the device is also apparent to those skilled in the art from the above description. However, this use will be briefly described. The retraction lever 35 is depressed thus raising the plunger 30 and anvil 23 and, of course, compressing spring 60. The threaded workpiece 11 is then positioned on the lower anvil 22 with the gaging wires in adjacent threads of the workpiece. Due to the proper adjustment of the position of the holder 83 relative to the anvil and thus adjustment of the freedom of movement of the lower gaging wires 98 and 100, these wires will assume the proper position without difficulty.

As the pressure of lever 35 is released spring 60 will move the anvil 23 downwardly and with it the centralizing plungers 64 as well, of course, as the gaging wire 90. The spring loaded plungers 64 first engage the crest of the threads on the workpiece 26 and as the upper anvil moves downwardly under the action of the spring 60 the plungers 64 will recede into the anvil against the resistance of the springs 71, these springs of course being proportioned to permit this action. This action continues until the plungers 64 have receded within the anvil and freed the upper gaging wire 90 so that it may seat in the proper thread groove as shown in Figure 5. When the lever 35 is fully released the device will be in gaging position and at this time the gaging wires 90, 98 and 100 will rest on the faces of the anvils 22 and 23 and the gage 24 will give an indication of the thread size, the accuracy of indication of course depending upon the accuracy of the gage used.

When the lever 35 is again depressed to raise the upper anvil 23 the plungers 64 will remain in contact with the threads until the plunger heads 68 come to rest on the rod 65 at which time the upper gaging wire 90 will again be placed between opposing surfaces of the plungers 64 and controlled thereby.

It will be clear, therefore, that the plungers 64 will provide a pivotal support for the wire assuring that the wires will be in a positionable range so as to properly seat in the threads of the workpiece as the parts move into gaging position. Further, that the plungers do not in any way limit the movement of the gaging wire once it has seated in the thread, the only limitation of their movement which is then present being supplied by the loops 88 and 91.

From the above description it will be apparent that the structure described facilitates the handling of gaging wires used in the three wire method especially for finer thread sizes and does so while permitting the use of the structure for the gaging of a wide range of thread sizes by the use of an easily performed adjustment of the centralizing or positioning plungers and of the limiting means for the positioning of the gage wires on the lower anvil.

While we have described a preferred embodiment of our invention, it will be understood that we wish to be limited not by the foregoing description, but solely by the claims granted to us.

What is claimed is:

1. In a gaging instrument of the type described, in combination, a pair of relatively movable anvil members, a pair of gaging wires on the surface of one of said anvil members, a single gaging wire adjacent the surface of the other of said anvil members, and means releasably guiding the single wire to position in a desired thread portion intermediate the portions engaged by said two wires, said guiding means comprising a pair of centralizing plungers between which said single wire lies, each plunger being mounted in a bore in the single wire anvil member and each plunger comprising a cylindrical portion and a squared portion, each plunger having a contoured portion adjacent its face, said single wire lying between said contoured portions of said plunger, means cooperating with said squared portions to hold each said plunger in a desired rotational position, said plungers being movable to present said cylindrical portions to said holding means to thereby release said plungers for rotation whereby different contoured portions are presented toward the other plunger of the pair to provide a gap between said contoured portions adapted to guide a gaging wire of a selected size into position in said intermediate thread portion and against said other anvil member.

2. A gaging instrument according to claim 1 wherein said holding means comprises a rod lying adjacent to and parallel with said squared portions and resilient means pressing said plungers into position with said squared portions in engagement with said rod.

3. A gaging instrument in accordance with claim 2 wherein said plungers are provided with slots in the faces thereof to facilitate the rotation of said plungers while moved into said released positions.

4. A gaging instrument in accordance with claim 3 wherein said slots extend to the edge of the plunger at one end only and are oriented so that correspondingly contoured sides of said plungers are presented to said gaging wires when said slots extend parallel to each other with the open ends of said slots facing in opposite directions.

References Cited in the file of this patent

UNITED STATES PATENTS

| | | |
|---|---|---|
| 1,531,357 | Tautz | Mar. 31, 1925 |
| 2,181,077 | Street | Nov. 21, 1939 |
| 2,431,021 | Bourdelais | Nov. 18, 1947 |
| 2,631,377 | Steczynski | Mar. 17, 1953 |
| 2,822,624 | Klink | Feb. 11, 1958 |